United States Patent
Dallas et al.

(10) Patent No.: US 7,758,674 B2
(45) Date of Patent: *Jul. 20, 2010

(54) AIR FILTER ASSEMBLY FOR LOW TEMPERATURE CATALYTIC PROCESSES

(75) Inventors: Andrew J. Dallas, Apple Valley, MN (US); Mark A. Gogins, Roseville, MN (US); Kristine Marie Graham, Minnetonka, MN (US); Daniel Adamek, Bloomington, MN (US); Robert Skuster, Bloomington, MN (US)

(73) Assignee: Donaldson Company, Inc., Minneapolis, MN (US)

( * ) Notice: Subject to any disclaimer, the term of this patent is extended or adjusted under 35 U.S.C. 154(b) by 803 days.

This patent is subject to a terminal disclaimer.

(21) Appl. No.: 11/463,700

(22) Filed: Aug. 10, 2006

(65) Prior Publication Data

US 2007/0003800 A1    Jan. 4, 2007

Related U.S. Application Data

(63) Continuation of application No. 10/696,442, filed on Oct. 28, 2003, now Pat. No. 7,101,419, which is a continuation of application No. 10/217,375, filed on Aug. 12, 2002, now Pat. No. 6,638,339, which is a continuation of application No. 09/660,127, filed on Sep. 12, 2000, now Pat. No. 6,432,177.

(51) Int. Cl.
*B01D 53/04*     (2006.01)
*H01M 8/06*      (2006.01)

(52) U.S. Cl. .................. 95/273; 96/135; 96/153; 55/385.1; 55/318

(58) Field of Classification Search .............. 429/13, 429/19, 39; 55/385.1, 315, 318, 527, 524; 95/273, 901; 96/108, 121, 132, 134, 135, 96/153

See application file for complete search history.

(56) References Cited

U.S. PATENT DOCUMENTS

| 3,217,715 | A | 11/1965 | Berger et al. ............... 131/342 |
| 3,847,672 | A | 11/1974 | Trocciola et al. |
| 4,032,457 | A * | 6/1977 | Matchett ...................... 210/489 |

(Continued)

FOREIGN PATENT DOCUMENTS

EP    0398 847    4/1990

(Continued)

OTHER PUBLICATIONS

Moore, J. et al., "The effects of battlefield contaminants on PEMFC performance", *Journal of Power Sources*, vol. 85, pp. 254-260 (2000).

(Continued)

*Primary Examiner*—Frank M Lawrence
(74) *Attorney, Agent, or Firm*—Pauly, DeVries Smith & Deffner, L.L.C.

(57) ABSTRACT

An air filter assembly for removing particulate contaminants, chemical contaminants, or both, from an incoming dirty air stream. The resulting filtered or clean air is supplied to catalytic equipment, such as a fuel cell. The filter assembly can include a physical filter portion for removing physical or particulate contaminants, a chemical filter portion for removing chemical contaminants, or can have both portions.

26 Claims, 3 Drawing Sheets

U.S. PATENT DOCUMENTS

| | | | |
|---|---|---|---|
| 4,080,791 A | 3/1978 | Nadler et al. | |
| 4,483,694 A | 11/1984 | Takamura et al. | |
| 4,595,642 A | 6/1986 | Nakanishi et al. | |
| 4,737,173 A | 4/1988 | Kudirka et al. | |
| 5,013,617 A | 5/1991 | Scheffler | |
| 5,156,925 A | 10/1992 | Lapp | |
| 5,189,092 A | 2/1993 | Koslow | |
| 5,221,586 A | 6/1993 | Morimoto et al. | |
| 5,288,469 A * | 2/1994 | Skalla | 422/171 |
| 5,331,037 A | 7/1994 | Koslow | |
| 5,372,617 A | 12/1994 | Kerrebrock et al. | |
| 5,376,609 A | 12/1994 | Guile | |
| 5,595,949 A | 1/1997 | Goldstein et al. | 502/20 |
| 5,626,820 A | 5/1997 | Kinkead et al. | |
| 5,641,031 A | 6/1997 | Riemer et al. | |
| 5,646,852 A | 7/1997 | Lorenz et al. | |
| 5,662,184 A | 9/1997 | Riemer et al. | |
| 5,772,738 A | 6/1998 | Muraoka | 96/129 |
| 5,794,732 A | 8/1998 | Lorenz et al. | |
| 5,837,393 A | 11/1998 | Okamoto | |
| 5,925,322 A | 7/1999 | Werth | 422/170 |
| 5,928,414 A | 7/1999 | Wnenchak et al. | |
| 5,944,878 A | 8/1999 | Lindhe | |
| 5,981,096 A | 11/1999 | Hornburg et al. | |
| 6,007,930 A | 12/1999 | Adams et al. | |
| 6,013,385 A | 1/2000 | DuBose | |
| 6,057,051 A | 5/2000 | Uchida et al. | |
| 6,074,769 A | 6/2000 | Johnssen | |
| 6,083,637 A | 7/2000 | Walz et al. | |
| 6,103,415 A | 8/2000 | Kurita et al. | |
| 6,110,611 A | 8/2000 | Stuhler et al. | |
| 6,117,579 A | 9/2000 | Gyoten et al. | |
| 6,124,052 A | 9/2000 | Katoh et al. | |
| 6,152,996 A | 11/2000 | Linnersten et al. | |
| 6,190,432 B1 | 2/2001 | Gieseke et al. | |
| 6,284,397 B1 | 9/2001 | Barton | |
| 6,296,957 B1 | 10/2001 | Graage | |
| 6,309,769 B1 | 10/2001 | Haug | |
| 6,316,134 B1 | 11/2001 | Cownden et al. | |
| 6,432,177 B1 * | 8/2002 | Dallas et al. | 96/132 |
| 6,601,736 B2 | 8/2003 | Ophardt et al. | |
| 6,638,339 B2 * | 10/2003 | Dallas et al. | 95/90 |
| 6,780,534 B2 | 8/2004 | Stenersen et al. | |
| 6,783,881 B2 | 8/2004 | Stenersen et al. | |
| 6,797,027 B2 | 9/2004 | Stenersen et al. | |
| 7,101,419 B2 * | 9/2006 | Dallas et al. | 95/273 |
| 7,122,258 B2 | 10/2006 | Traver | |
| 2002/0150805 A1 | 10/2002 | Stenersen et al. | |

FOREIGN PATENT DOCUMENTS

| | | |
|---|---|---|
| EP | 0677417 | 2/1995 |
| GB | 2250130 | 11/1991 |
| JP | 60-054177 A | 3/1885 |
| JP | 54087677 | 7/1979 |
| JP | 07-094200 A | 7/1995 |
| JP | 09308813 | 12/1996 |
| WO | WO 97/48144 | 12/1997 |
| WO | WO 01/48850 | 7/2001 |

OTHER PUBLICATIONS

Sakamoto, S. et al., "Study of the Factors Affecting PEFC Life Characteristic", *Ecology and Energy Systems Research Center, Sanyo Electric Co.. Ltd.*, Tochigi 326-8534, Japan, pp. 141-144 (date unknown).

Füßer, Rolf, et al., "Air Intake and Exhaust Systems in Fuel Cell Engines", *Society of Automotive Engineers, Inc.*, SAE The Engineering Society for Advancing Mobility Land Sea Air and Space International,(2000), 7 pages.

* cited by examiner

AIR FILTER ASSEMBLY FOR LOW TEMPERATURE CATALYTIC PROCESSES

This application is a continuation of U.S. patent application Ser. No. 10/696,442, filed Oct. 28, 2003 now U.S. Pat. No. 7,101,419, which is a continuation of U.S. patent application 10/217,375, filed Aug. 12, 2002, now U.S. Pat. No. 6,638,339, which is a continuation of U.S. patent application Ser. No. 09/660,127, filed Sep. 12, 2000, now U.S. Pat. No. 6,432,177, all of which are incorporated herein by reference in their entirety.

FIELD OF THE DISCLOSURE

The present disclosure is related to air filtering systems for low temperature catalytic processes. In particular, the disclosure is directed to air filters for use with a fuel cell apparatus.

BACKGROUND OF THE DISCLOSURE

It is accepted that in today's world all atmospheric air has some degree of contaminants present in it. These contaminants may be large items, for example, blown leaves, loose papers and other debris, cottonwood tree blossoms, and insects; or the contaminants may be small enough, such as particulates, that they are suspended in the atmosphere. Examples of such particulates include dust, tree pollen, smog, and smoke particulates.

Chemical contaminants are also widely present in atmospheric air. Although many are the result of man-made pollution, other chemicals occur naturally. Typical contaminants include volatile organic compounds such as methane, butane, propane, and other hydrocarbons, also ammonia, oxides of nitrogen, oxides of sulfur, carbon monoxide, hydrogen sulfide, etc.

Most of today's machines, such as automobiles, are designed to be able to either filter out or withstand any contaminants that could cause problems to their operation. For example, large contaminants such as leaves and paper are removed from the intake air stream by the automobiles' grills and various vents. These features also remove small animals such as birds, squirrels and mice that may find their way into the engine area. Finer contaminants such as dust are removed by an air filter present in the engine compartment. For the typical automobile and internal combustion machines (such as lawn mowers, snowblowers, snowmobiles, etc.) chemical contaminants pose very little, if any, problems to the functioning of the machine, because the machine and the process by which it produces power, are capable of withstanding the presence of contaminants in the intake air.

There are some machines and systems that have not yet been optimized for operating in today's contaminated atmosphere. This may be because the importance of clean intake air has not been recognized as a requirement for efficient and/or optimal operation, or because those contaminants in the air that may degrade the performance of the machine have not yet been adequately recognized or defined.

The fuel cell, a rapidly emerging source of power for both residential and commercial purposes, is one type of system that is not yet fully understood. A fuel cell is a device consisting of two electrodes (an anode and a cathode), between which is sandwiched an electrolyte. Depending on the size, shape and design of the cell, the fuel cell is capable of providing enough energy to run a cell phone, a computer, an automobile, a residential house, or even a power plant. Fuel cells typically operate with a fuel source being supplied to the anodic side of the cell and an oxidant being supplied to the cathodic side. An example of a commonly used fuel is hydrogen.

Many fuel cells are not designed to operate efficiently in the presence of large amounts of contaminants which may be present in the intake air that is necessary for the functioning of the fuel cell. They also have not generally been designed to handle or filter such contaminants from the intake air. This is because fuel cells, and their operation, are typically new, and their operation parameters are typically not well defined. The overall capabilities and limits of fuel cells generally are not completely understood.

What is desired, therefore, is a fuel cell that functions within environments having a wide range of contaminants.

SUMMARY OF THE DISCLOSURE

The present invention provides an air filter assembly for filtering the intake air used in low temperature catalytic reactions, such as fuel cells. The assembly provides either particulate filtration, chemical filtration, or both, to the incoming air stream to provide a purified oxidant to the cathodic side of a catalytic reactor, such as a fuel cell.

The filter assembly captures and retains particulate and/or chemical contaminants that can harm the catalytic process. In one embodiment of the invention, a filter assembly is provided that can capture and temporarily retain the chemical contaminants, releasing the contaminants when the incoming dirty air has levels of those contaminants below the accepted level.

The filter assembly is useful in low temperature catalytic processes. In one embodiment, the filter assembly can be used on proton exchange membrane (PEM) fuel cells.

In particular in one embodiment, the invention is directed to a system for producing power. The system comprises an air filter assembly which comprises: a housing and a filter element in the housing. The housing has an inlet and an outlet, the inlet providing dirty atmospheric air to the filter assembly, and the outlet providing clean air from the filter assembly. The filter element comprises a physical or particulate filter portion constructed and arranged to remove particulate contaminants from the dirty air and a chemical filter portion constructed and arranged to remove chemical contaminants from the dirty air. The system further includes a fuel cell having an air intake port. The air filter assembly is constructed and arranged to provide clean air from the outlet of the filter assembly to the intake port of the fuel cell.

In another particular embodiment of the invention, a filter assembly for use with a fuel cell is provided. The filter assembly has a housing and a filter element in the housing. The housing has an inlet and an outlet, the inlet providing dirty air to the filter assembly, and the outlet providing clean air from the filter assembly. The filter element has a physical filter portion constructed and arranged to remove particulate contaminants from the dirty air and a chemical filter portion constructed and arranged to remove chemical contaminants from the dirty air. In particular, the chemical filter portion has a first portion constructed and arranged to remove ammonia and amines from the dirty air, the first portion comprising impregnated activated carbon adsorption media; a second portion constructed and arranged to remove acidic gases and organic materials from the dirty air, the second portion comprising impregnated activated carbon adsorption media; and a third portion constructed and arranged to oxidize contaminants in the dirty air, the third portion comprising catalyst material. A fourth portion, and any additional portions, can be included.

In yet a further embodiment of the invention, a filter assembly for use with a fuel cell is provided, which can include at least one inlet configured to receive a dirty gas stream, an outlet adapted to be connected in communication with an oxidant inlet of a fuel cell, a particulate filter, a chemical filter comprising carbon adsorbent material, with the particulate and chemical filters being configured, in combination, to remove particulate and gas phase contaminates from the dirty gas stream and to provide a cleaned gas stream, suitable for use by a fuel cell, to the outlet.

The invention also encompasses fuel cell systems. In one embodiment, a fuel cell system is provided which comprises a fuel cell having an oxidant inlet and a filter assembly having an inlet, a filter element, and an outlet, the inlet being configured to receive a dirty oxidant stream having gas phase contaminants, the filter element adapted to remove the gas phase contaminants from the dirty oxidant stream received through the inlet, to provide a cleaned oxidant stream, and the outlet being configured for connection to the fuel cell oxidant inlet, through which the cleaned oxidant stream passes to the fuel cell. The filter element can include adsorbent material that is at least one solid mass of adsorbent material, that is extruded activated carbon, that is shaped, such as with a curved shape, or, it can include granulated adsorbent material. In another embodiment, a fuel cell system is provided which comprises a fuel cell having an oxidant inlet, and a filter assembly having an inlet configured to receive a dirty oxidant stream having gas phase contaminants, a filter element adapted to condition the dirty oxidant stream received through the inlet, to provide a cleaned oxidant stream with gas phase contaminants below a predetermined threshold limit, and an outlet configured for connection to the fuel cell oxidant inlet, through which the cleaned oxidant stream passes to the fuel cell.

Another embodiment of the invention is a method of controlling contaminants within a gas stream to a gas inlet of a fuel cell. The method includes providing a filter assembly comprising a particulate filter and a chemical filter comprising carbon absorbent material, each of the particulate filter and the chemical filter having an inlet and an outlet; passing a dirty gas stream into the inlet of each of the particulate filter and the chemical filter to remove contaminants from the dirty gas stream to provide a cleaned gas stream; and providing the cleaned gas stream to the gas inlet of the fuel cell.

DETAILED DESCRIPTION OF THE PREFERRED EMBODIMENT

Figure 1:
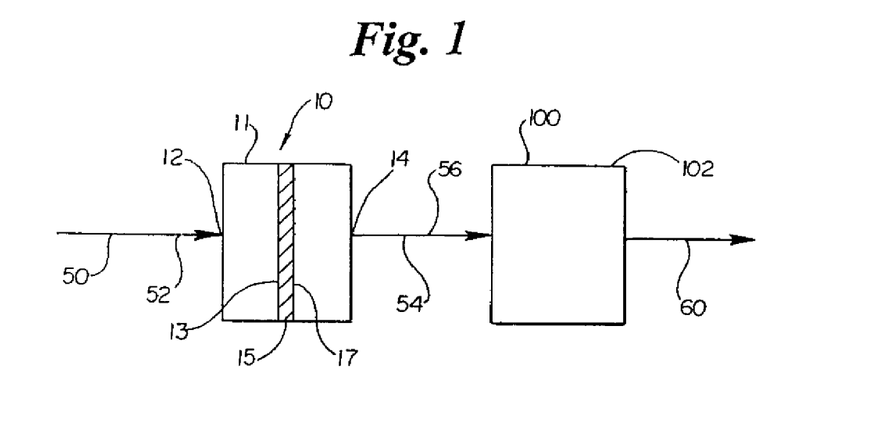
FIG. 1 is a schematic depiction of a power production system including the filter assembly of the present invention.

Referring to FIG. 1, one application for the filter assembly 10 of the present invention is to remove contaminants from air being used by equipment such as equipment which uses low temperature catalytic processes.

As depicted in FIG. 1, atmospheric or ambient air 50 enters filter assembly 10 via inlet 12. Prior to entering filter assembly 10, atmospheric air 50 is dirty air 52, having various physical (e.g., particulate) and chemical contaminants. Filter element 15 filters the dirty air 52 to provide clean air 54 that exits from filter assembly 10 via outlet 14. Clean air 54 is the intake air 56 for equipment 100. In the embodiment depicted in FIG. 1, equipment 100 is a fuel cell 102. The equipment 100 operates utilizing intake air 56; exhaust air 60 exits from equipment 100.

Referring still to FIG. 1, filter assembly 10 of the present invention has inlet 12 for receiving air and bringing it in to the various filter elements of filter assembly 10. Filter assembly 10 has at least one filter element 15, having a dirty air side 13 and a clean air side 17. In most embodiments, filter element 15 is enclosed within or otherwise encased by a housing 11. Filter assembly 10 also includes outlet 14 for removing air from the filter assembly 10 and passing it further to fuel cell 102 or other equipment 100.

Atmospheric air 50 enters filter assembly 10 through inlet 12 in housing 11 and progresses to dirty air side 13 of filter element 15. As the air passes through filter element 15 to clean air side 17, contaminants are removed to provide filtered air 54. The filtered air passes through outlet 14 of housing 11 of filter assembly 10 and is used by equipment 100. The type and extent of contaminants removed from the air to provide filtered air 54 depends on the contaminants present in atmospheric air 50 and the configuration of the at least one filter element 15.

Figure 2:
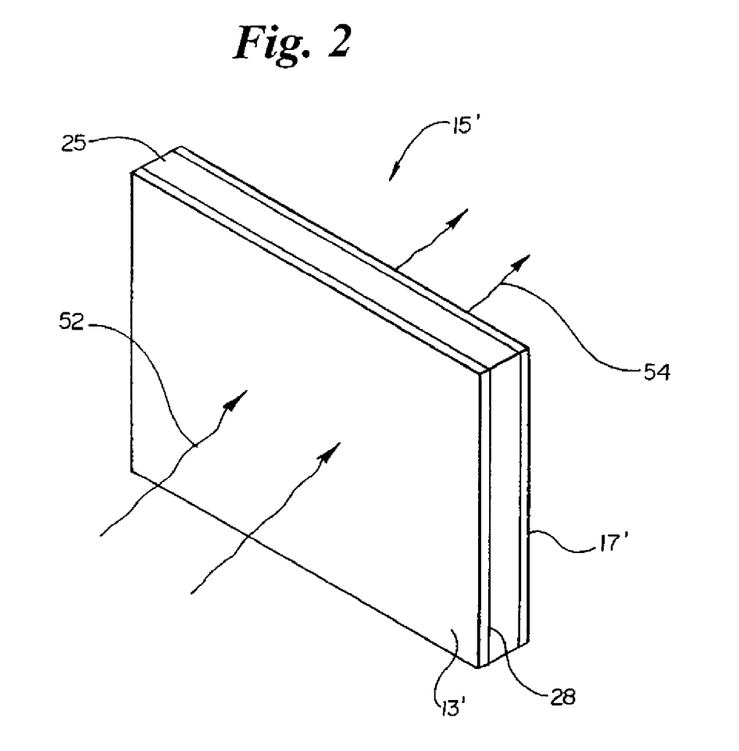
FIG. 2 is a schematic, perspective view of a first embodiment of a filter element for use with the filter assembly of FIG. 1.

The structure of the filter element 15 can be a panel filter, which is a filter having generally a two dimensional structure. An example of a panel filter element 15' is shown in FIG. 2. For ease of identification, those elements in the second embodiment of FIG. 2 that are the same or which perform the same function as comparable elements in the general embodiment (FIG. 1) are followed by a prime ("'") designation in FIG. 2. The same follows for additional embodiments, such as the embodiment of FIG. 3.

Dirty air 52 enters first, clean side 13' of panel filter 15', passes through filter media 25, and exits second, dirty side 17' as clean air 54. Panel filter 15' can include an outer liner 28 on either or both of first side 13' and second side 17' in order to protect filter media 25 and optionally remove large particulates or debris. Filter media 25 is at least one of a particulate filter element and a chemical filter element, as described below. In some embodiments, filter media 25 removes both particulate and chemical contaminants.

Figure 3:
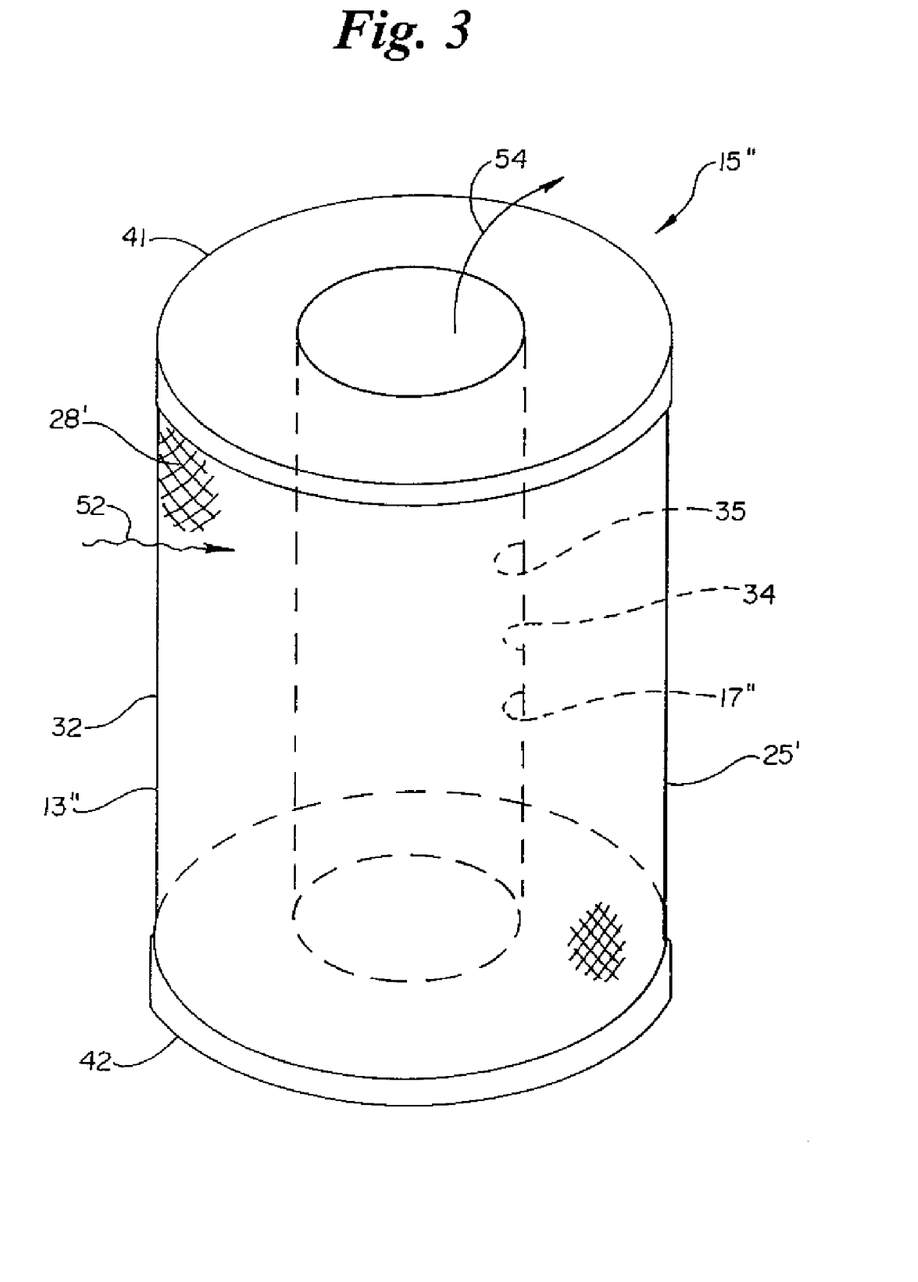
FIG. 3 is a schematic, perspective view of a second embodiment of a filter element for use with the filter assembly of FIG. 1.

Alternately, the structure of filter element 15 can be a tubular or cylindrical filter element 15", such as is shown in FIG. 3. Generally, a tubular filter element includes an extension of filter media 25' between two end caps 41, 42. The filter element 15 has an outer surface 32 and an inner surface 34, which defines an interior volume 35. The first end cap 41 is often an "open" end cap that allow access to interior volume 35; the second end cap 42 is often a "closed" end cap that extends across the entire bottom of tubular filter element 15" and does not allow access to interior volume 35. An outer liner 28' can be disposed over outer surface 32 of filter element 15" to protect filter media 25'; an inner liner can be disposed over inner surface 34. Filter media 25' is at least one of a particulate filter element and a chemical filter element, as described below, or filter media 25' removes both particulate and chemical contaminants.

In a tubular filter element 15", the air is conducted through filter media 25' in either an inside/out (i.e., "reverse flow") or outside/in (i.e., "forward flow") flow pattern relative to the filter element. In FIG. 3, dirty air 52 is depicted entering the outer surface 32 of filter media 25', exiting through inner surface 34, and passing through interior volume 35 to leave filter element 30. In such an embodiment, outer surface 32 is dirty air side 13" and inner surface 34 is clean air side 17". In a "reverse flow" embodiment, inner surface 34 would be the dirty air side and outer surface 32 would be the clean air side.

The panel filter element 15' and the tubular filter element 15" are designed to remove physical (e.g., particulate) contaminants, chemical contaminants, or both. In particular, the filter media 25 of panel filter 15' and filter media 25' of tubular element 15" are selected for their capability for removing physical (e.g., particulate) contaminants, chemical contaminants, or both. A separate portion of the filter element can be used for the removal of each contaminant, or a single filter element can be used for the removal of multiple contaminants. Preferably, although not necessarily, a separate particulate filter portion is used for removing physical contaminants such as particulates and a chemical filter portion is used for removing chemical contaminants. This arrangement is preferred to maximize the efficiency of the chemical filter element by removing large particulates before they reach the chemical filter portion and potentially clog, block, or occlude the filter.

Physical Filter Portion of the Filter Element

The filter assembly 10 of the present invention, in particular the filter element 15 such as panel filter 15' or tubular filter 15", can include a portion for removing physical contaminants such as particulates from the incoming air. A series of particulate filter portions may be used, with each subsequent filter element portion removing a smaller size particle. Alternately, a single particulate filtering portion can be used.

A coarse filter portion is preferably present to remove large contaminants such as leaves, seeds, paper and other garbage and debris, cottonwood tree blossoms, and to keep small animals such as rodents out from the intake manifold of the equipment. Such a coarse filter portion can be a grate, mesh, or the like, and may be metal, plastic or any suitable material, and may be incorporated into inlet 12 of housing 11 enclosing filter element 15. The coarse filter portion generally removes objects having a size of at least about 1 inch (about 2.5 cm) diameter and more, typically objects having a size of at least about 0.5 inch (about 1.25 cm) diameter and more, and in some embodiment, objects having a size of at least about 0.25 inch (about 0.635 cm) and more.

Typically, the particulate filter portion contains a filter media, such as a fibrous mat or web, including paper, to remove particles down to about 0.01 mm in size. Examples of particulates removed by a particulate filter include dust, dirt, pollen, insects, wood chips and saw dust, metal shavings, and the like.

The filter media can be treated in any number of ways to improve its efficiency in removing minute particulates; for example, electrostatically treated media can be used, as can cellulose media having one or more layers of fine fiber, or other types of media known to those skilled in the art.

A sub-micron filter portion, such as a HEPA (high efficiency particle air) filter can be included in the filter assembly. Sub-micron filters are typically intended to remove microscopic particulate, such as aerosols produced by combustion, bacteria, viruses, and the like.

The particulate filter portion can be designed to remove liquid contaminants, such as rain and sleet from the incoming air. To remove liquids from the air, the air stream is preferably passed through a filter portion that utilizes materials with a high surface energy, so that the liquid coalesces and can be removed. Media having a hydrophobic surface, such as coated glass fibers, is an example of a media that can be used to remove liquid contaminants. Another example of a media for removing liquid contaminants is a media of treated glass fibers combined with foamed hot melt beads. These exemplary media can be incorporated into extensions of filter media, such as pleated paper extensions. In some embodiments, the preferred technique for removing liquid contaminants is to use an inertial separator; this, however, can be dependent on the space available within the fuel cell apparatus. An expanded PTFE (polytetrafluoroethylene) membrane can also be used to remove liquid from the air. Expanded PTFE is a microporous membrane that, because of the pore size, allows the passage of moisture (vapor) through but not liquid.

It is understood that any number of particulate filter portions having any combination of particulate removal efficiency can be used. The desired particulate removal system will depend on the type of contaminants present in the atmosphere (for example, leaves, cottonwood blossoms, lint, snow, etc.) and the desired cleanliness level of the resulting filtered air.

Chemical Filter Portion of the Filter Element

The filter assembly 10, in particular the filter element 15 such as panel filter 15' or tubular filter 15", can include a portion designed to remove contaminants from the atmosphere by either adsorption or absorption. As used herein, the terms "adsorb", "adsorption", "adsorbent" and the like, are intended to also include the mechanisms of absorption and adsorption.

The chemical filter portion typically includes a physisorbent or chemisorbent material, such as, for example, desiccants (i.e., materials that adsorb or absorb water or water vapor) or materials that adsorb or absorb volatile organic compounds and/or acid gases and/or basic gases. Suitable adsorbent materials include, for example, activated carbon, activated carbon fibers, impregnated carbon, activated alumina, molecular sieves, ion-exchange resins, ion-exchange fibers, silica gel, alumina, and silica. Any of these materials can be combined with or impregnated with materials such as potassium permanganate, calcium carbonate, potassium carbonate, sodium carbonate, calcium sulfate, or mixtures thereof. In some embodiments, the adsorbent material can be combined or impregnated with a second material. For some designs, it may be desired to have a bed of activated carbon upstream of a bed of impregnated carbon.

The adsorbent materials are typically particulates or granulated material and can be present as granules, beads, fibers, fine powders, nanostructures, nanotubes, aerogels, or can be present as a coating on a base material such as a ceramic bead, monolithic structures, paper media, or metallic surface. Typically, the adsorbent materials, especially particulate or granulated materials, are provided as a bed of material.

Alternately, the adsorbent material can be shaped into a monolithic or unitary form, such as a large tablet, granule, bead, or pleatable or honeycomb structure that optionally can be further shaped. In at least some instances, the shaped adsorbent material substantially retains its shape during the normal or expected lifetime of the filter assembly. The shaped adsorbent material can be formed from a free-flowing particulate material combined with a solid or liquid binder that is then shaped into a non-free-flowing article. The shaped adsorbent material can be formed by, for example, a molding, a compression molding, or an extrusion process.

The binder used can be dry, that is, in powdered and/or granular form, or the binder can be a liquid, solvated, or dispersed binder. Certain binders, such as moisture curable urethanes and materials typically referred to as "hot melts", can be applied directly to the adsorbent material by a spray process. In some embodiments, a temporary liquid binder, including a solvent or dispersant which can be removed during the molding process, is used. Suitable binders include, for example, latex, microcrystalline cellulose, polyvinyl alcohol, starch, carboxyl methyl cellulose, polyvinylpyrrolidone, dicalcium phosphate dihydrate, and sodium silicate.

Preferably the composition of a shaped material includes at least about 70%, by weight, and typically not more than about 98%, by weight, adsorbent material. In some instances, the shaped adsorbent includes 85 to 95%, preferably, approximately 90%, by weight, adsorbent material. The shaped adsorbent typically includes not less than about 2%, by weight, binder and not more than about 30%, by weight, binder. Further information regarding mold release, other additives, and molding techniques are discussed in U.S. Pat. No. 5,876,487, the entire disclosure of which is incorporated herein by reference.

Another embodiment of a suitable adsorbent material for use in the chemical filter portion is an adsorbent material that includes a carrier. For example, a mesh or scrim can be used to hold the adsorbent material and binder. Polyester and other suitable materials can be used as the mesh or scrim. Typically, any carrier is not more than about 50% of the weight of the adsorbent material, and is more often about 20 to 40% of the total adsorbent weight. The amount of binder in the shaped adsorbed article with the carrier typically ranges about 10 to 50% of the total adsorbent weight and the amount of adsorbent material typically ranges about 20 to 60% of the total adsorbent weight.

The chemical filter portion can have strongly basic materials for the removal of acid contaminants from the air, or strongly acidic materials for the removal of basic contaminants from the air, or both. Preferably, the basic materials and acidic materials are removed from each other so that they do not cancel each other. Examples of acidic compounds that are often present in atmospheric air include sulfur oxides, nitrogen oxides, hydrogen sulfide, hydrogen chloride, and volatile organic acids and nonvolatile organic acids. Examples of basic compounds that are often present in atmospheric air include ammonia, amines, amides, sodium hydroxides, lithium hydroxides, potassium hydroxides, volatile organic bases and nonvolatile organic bases. In general, the acidic and basic materials of the chemical filter portion remove contaminants from the air by trapping the contaminants on their surfaces; typically, the acidic and basic surfaces react with the contaminants, thus adsorbing the contaminants at least on the surfaces.

In some embodiments, the composition itself of the carrier may be the strongly acidic or strong basic material. Examples of such materials include materials such as polymer particulates, activated carbon media, zeolites, clays, silica gels, and metal oxides. In other embodiments, the strongly acidic materials and the strongly basic materials can be provided as surface coatings on carriers such as granular particulate, beads, fibers, fine powders, nanotubes, and aerogels. Alternately or additionally, the acidic and basic material that forms the acidic and basic surfaces may be present throughout at least a portion of the carrier; this can be done, for example, by impregnating the carrier material with the acidic or basic material.

An example of a preferred material for removing basic contaminants, such as ammonia, is a bed of activated carbon granules impregnated with citric acid.

An example of a preferred material for removing acidic contaminants is a bed of impregnated activated carbon granules that are commercially available from C*Chem, a division of IONEX Research Corp. of Lafayette, Colo., under the trade designation "Chemsorb 1202".

Both basic and acidic materials may be present in the chemical filter portion of the filter element; however, it is preferable that the two types of materials are spaced from each other so that they do not react with and neutralize one another.

The chemical filter portion can include other materials that are tailored to the removal of certain contaminants. As one example, a strong oxidizing material can be included to remove carbon monoxide from the air. Examples of strong oxidizing materials include: catalytic material, such that available from available from MSA of Pittsburgh, Pa. under the trade designation "Hopcalite" (a mixture of porous manganese oxide and copper oxide), precious metals, transition metals, and combinations thereof; chemisorptive materials, such as materials similar to "Hopcalite", precious metals, transition metals, inorganic and organic oxides, salts, and metals; hydrogen peroxide; permanganates; and chromates.

A strong oxidizing material can be included to remove nitrogen oxides (NOx) from the air.

The chemical filter portion may capture and permanently retain chemical contaminants from the dirty air stream, or the chemical filter portion may release the chemical contaminants at a later time. For example, the chemical filter portion removes chemical contaminants from the dirty air stream so that the filtered clean air has a contaminant concentration that is below, or at least at, an acceptable threshold before passing the air into the input of the equipment, such as the fuel cell. When the contaminant level in the dirty air stream is below the threshold level, it is not necessary for the filter element to remove contaminants; rather, in some embodiments the chemical filter portion may release some of the collected contaminants, up to the threshold level. This is generally caused by the contaminate concentration differential between the dirty air stream and the chemical filter portion. In this way, the chemical portion may be partially regenerated, thereby extending the useful life of the chemical filter portion. Such a design may be desired when an acceptable threshold level of contaminants into the fuel cell is known.

A particulate filter portion and chemical filter portion can be combined to provide a single filter element that removes both physical and chemical contaminants. In one example, the filter media of a particulate filter portion can be made with fibers that have a surface treatment capable of chemisorbing or otherwise reacting or interacting with acidic or basic contaminants, thus providing a chemical filter portion. In another example, a bed of activated carbon granules can also remove physical contaminants from the air if the spacing between the granules is sufficiently small.

In some embodiments, it may be desired to provide a by-pass system for by-passing the chemical filter portion. This may be desired in environments when the intake air is not highly contaminated with chemical contaminants. This by-pass system may be activated and deactivated, depending on the contaminant levels in the intake air stream.

Preferred Filter Assemblies

A first example of a preferred filter assembly is a filter assembly having both particulate and chemical filtration capabilities. In this particular embodiment, the filter assembly has one layer of particulate media providing a physical filter portion and three layers of adsorptive media providing a chemical filter portion. Preferably, the physical portion is upstream from the chemical portion; that is, the stream of air to be cleaned first passes through the particulate filter portion and then through the chemical filter portion. Each of the three layers of adsorptive media is a bed of granular material that is contained in, and separated from the other beds by, perforated aluminum dividers.

Generally, one preferred filter assembly construction has a first layer of pleated glass media as a particulate filter positioned around two packaged granular carbon beds and a central electrostatic media.

The particulate filter portion preferably has a pleated glass fiber media having a construction well known in the filter art. Beads of material, such as hot melt adhesive, can be used for pleat separation.

In the preferred embodiment, the first layer of the chemical filter portion comprises activated carbon with about 35% (by weight) citric acid impregnated therein. Preferably, an 8×16 mesh sized material is used, such as that which is commercially available from Calgon Carbon Corp. of Richmond, Calif., under the trade designation "RVCA 12" or "RVCA 35". This first layer removes ammonia and amines from the air stream, as well as some hydrocarbons and other organic materials. The second layer of the chemical filter portion comprises a second impregnated activated carbon. Preferably, an 8×16 mesh sized material is used, such as that which is commercially available from C*Chem under the trade designation "Chemsorb 1202". This second layer is used to remove acidic gases, hydrocarbons, and other organic materials. The third layer of the chemical filter portion comprises a catalyst. Preferably, a 12×20 mesh sized material is used, such as that which is commercially available from Carus Chemical Company under the trade designation "Carulite 300". This layer oxidizes CO into $CO_2$.

A second example of a preferred filter assembly is a filter assembly similar to that of the first example, except that the "RVCA 12" or "RVCA 35" impregnated activated carbon of the first layer is replaced with a non-carbon adsorptive media.

A third example of a preferred filter assembly is a filter assembly similar to that of the first example, except that the "RVCA 12" or "RVCA 35" impregnated activated carbon of the first layer is replaced with a non-carbon catalytic media.

A fourth example of a preferred filter assembly is a filter assembly similar to that of the first example, except that the "Chemsorb 1202" impregnated activated carbon of the second layer is replaced with a non-carbon adsorptive media.

A fifth example of a preferred filter assembly is a filter assembly similar to that of the first example, except that the "Chemsorb 1202" impregnated activated carbon of the second layer is replaced with a non-carbon catalytic media.

In yet another example, one or two of the packed beds of carbon material can be replaced with a web of carbon material which is wrapped around a suitable core or liner.

Figure 4:
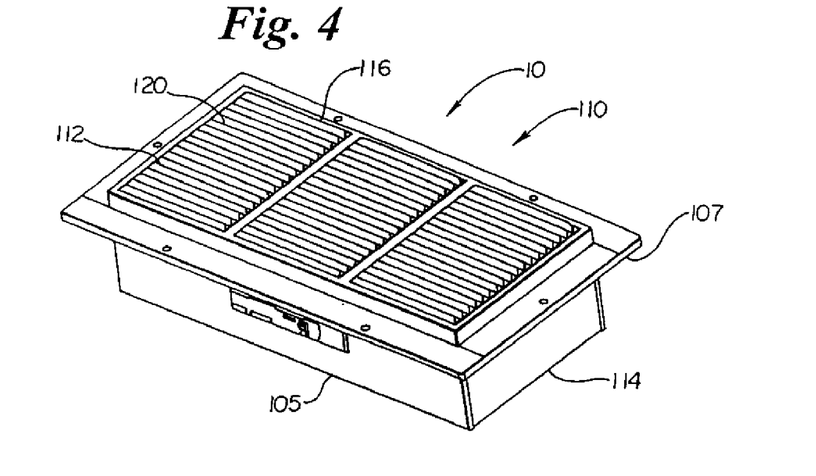
FIG. 4 is a perspective view of a preferred embodiment of a filter assembly.
Figure 5:
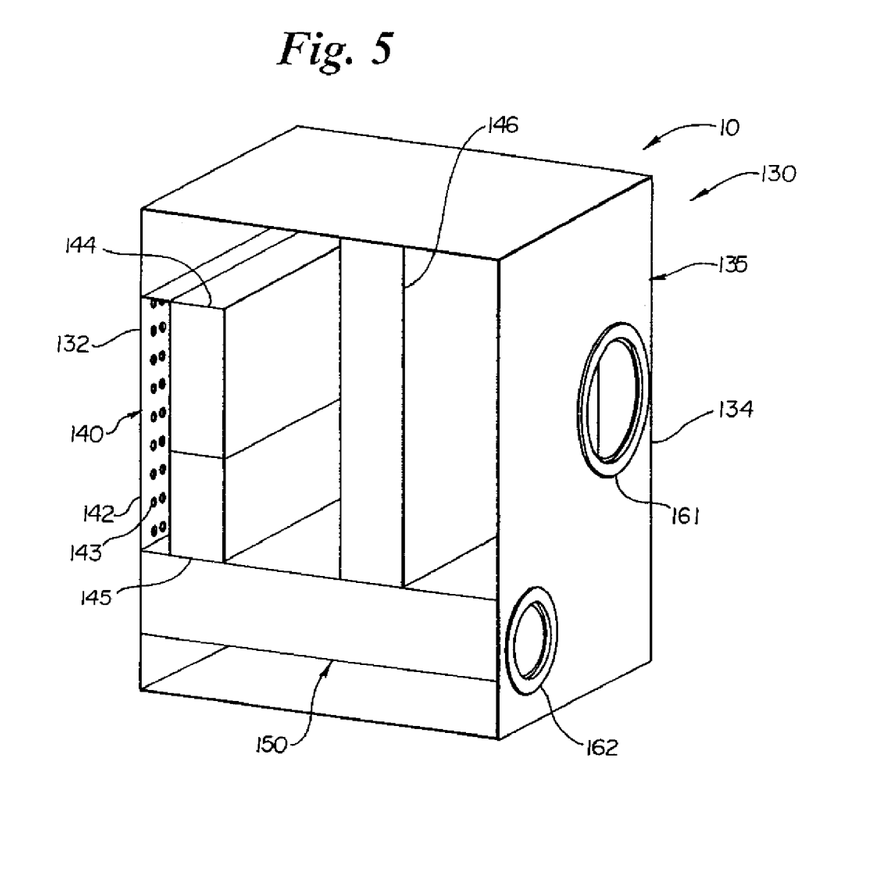
FIG. 5 is a perspective view of a second preferred embodiment of a filter assembly.

Referring to FIGS. 4 and 5, two physical embodiments of filter assemblies configured according to the principles of this invention are shown. In FIG. 4, filter assembly 10 is in the nature of a panel filter 110 having a housing 105 with a first side 112 and a second side 114. Panel filter 110 includes a physical filter portion 120 at first side 112. Physical filter portion 120 is configured as a louvered grate 116 for removing large particulate, such as leaves and debris. Grate 116 can be integral with housing 105 or can be removable from housing 105. A flange 107 extends from housing 105 away from grate 116. A gasket can be provide with flange 107 to provide improved sealing of panel filter 110 with an inlet port of any equipment, such as a fuel cell.

In one embodiment, panel filter 110 is approximately 4.15 inches (about 10.5 cm) deep from grate 116 to second side 114 with flange 107, which is approximately 0.25 inch (about 0.635 cm) thick, positioned approximately 3.21 inches (about 8.15 cm) from second side 114. The overall size of housing 102, not including flange 107, is approximately 15 inches (about 38 cm) wide and 7 inches (about 17.8 cm) tall. Including flange 107, the width is approximately 17.25 inches (about 43.8 cm) and the height is approximately 9.25 inches (about 23.5 cm). It will be understood by those skilled in the art that the dimensions of such a filter will vary based upon the application with which the filter is used.

Air to be filtered enters panel filter 110 through grate 116, which removes large particulate. Disposed behind grate 116 can be another physical filter portion, a chemical filter portion, or both. Preferably, at least one chemical filter portion of the type generally described above is disposed within housing 105 behind grate 116. Filtered air, after having passed through grate 116 and any other physical filter portion or chemical filter portion, exits panel filter 110 at second side 114.

Referring to FIG. 5, filter assembly 10 is a box-type filter assembly 130 having a six-sided housing 135. In FIG. 5, the housing 135 is shown without one wall to facilitate description of the filter assembly 130. Filter assembly 130 has a first side 132 and a second side 134.

Retained within housing 135 is a physical filter portion 140 and a chemical filter portion 150. Various baffles and channels are within housing 135 to provide the desired flow of air. Physical filter portion 140 includes perforated screen 142 having apertures 143 therein for the intake of dirty atmospheric air. The air passes through apertures 143 and any large items, such as leaves and debris are removed. From there, the air progress through a moisture eliminator 144 which removes droplets of water, such as rain, and the fluid is collected by a drainage collector 145, which may allow the collected fluid to drain to the exterior of housing 135. A high efficiency particulate filter 146 is included to remove particulates that passed through apertures 143. Filter assembly 130 also includes a chemical filter portion 150, such as a bed of granulated carbon or combination of adsorbents, for the adsorption of chemical contaminants. In the embodiment shown in FIG. 5, it is possible for the air to by-pass high efficiency particulate filter 146 and progress to chemical filter portion 150 after passing through moisture eliminator 144. Such a path would be desired in order to maintain the flow of air through filter assembly 130 even when, for example, high efficiency filter 146 clogs or occludes.

Second side 134 of housing 135 has a first outlet 161 and a second outlet 162. First outlet 161 feeds clean, filtered air from filter assembly 130 to equipment, such as an electrical enclosure. Second outlet 162 feeds clean, filtered air from filter assembly 130 to equipment, such as a fuel cell. The air exiting via second outlet 162 can be passed through the same filter process as the air exiting via first outlet 161, or, different filtering operations can be performed on the various streams. In one embodiment, air passing through second outlet 162 is passed through all features of physical filter portion 140 and through chemical filter portion 150; the air passing through first outlet 161 is passed through only the features of physical filter portion 140.

In one embodiment, filter assembly 130 is approximately 12 inches by 17 inches by 13 inches (about 30.5 cm by 43.2 cm by 33 cm), with first side 132 having perforated screen 142 being approximately 12 inches (about 30.5 cm) wide and approximately 17 inches (about 43.2 cm) high. Moisture eliminator 144 is approximately 12 inches by 5.25 inches by 2 inches (about 30.5 cm by 13.3 cm by 5 cm). Particulate filter 146 is approximately 10 inches by 12 inches by 4 inches (about 25.4 cm by 30.5 cm by 10.2 cm). Chemical filter portion 150 is approximately 12 inches by 11 inches and 3 inches thick (about 30.5 cm by 27.9 cm by 7.6 cm). Such an embodiment can process approximately 55 cubic feet per minute (cfm) (about 1.56 cubic meters per minute) of dirty air, with 35 cfm (about 1 cubic meter per minute) exiting through first outlet 161 and 20 cfm (about 0.56 cubic meter per minute) exiting through second outlet 162.

Fuel Cells

In FIG. 1, equipment 100 with which the filter assembly 10 of the present invention operates is depicted as a fuel cell 102. Fuel cells are devices consisting of two electrodes (an anode and a cathode) that sandwich an electrolyte. A fuel containing hydrogen flows to the anode, where the hydrogen electrons are freed, leaving positively charged ions. The electrons travel through an external circuit which the ions diffuse through the electrolyte. At the cathode, the electrons combine with the hydrogen ions and oxygen to form water and carbon dioxide, by-products. To speed the reaction, a catalyst is often used. Examples of catalysts often used in the fuel cell reaction include nickel, platinum, palladium, cobalt, cesium, neodymium, and other rare earth metals. The reactants in the fuel cell are the hydrogen fuel and an oxidizer.

Typically, the fuel cell 102 for use with the filter assembly is known as a "low temperature fuel cell" because of its low operation temperature, typically about 70 to 90° C. High temperature fuel cells are also known, however, these are typically not as sensitive to chemical contamination due to their higher operating temperature. High temperature fuel cells are however sensitive to particulate contamination, and some forms of chemical contamination, and may benefit from the type of filtration system described herein. One type of low temperature fuel cell is commonly referred to as a "PEM", is named for its use of a proton exchange membrane. PEM fuel cells will benefit by being used in conjunction with a filter assembly according to the present invention. Examples of other various types of fuel cells that can be used in combination with the filter assembly of the present invention include, for example, U.S. Pat. Nos. 6,110,611; 6,117,579; 6,103,415; and 6,083,637, the disclosures of which are incorporated here by reference. It will be recognized by one skilled in the art of fuel cells that the filter assembly will benefit the operation of generally any fuel cell.

The threshold levels of contaminants that are acceptable by various fuel cells is dependent on the design of the fuel cell. For example, hydrocarbons (methane and heavier), ammonia, sulfur dioxide, carbon monoxide, silicones, and the like, are known to occupy space on the catalyst and inactivate the sites to reaction. Thus, these contaminants need to be removed prior to their entering the reactive area of the fuel cell.

The exact level of contamination, and types contaminants that are acceptable will vary depending on the catalyst used, the operating conditions, and the catalytic process efficiency requirements.

The filter assembly of the present invention removes contaminants from the atmospheric air before the air is used in the fuel cell operation.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size and arrangement of parts within the principles of the disclosure to the full extent indicated by the broad general meaning of the terms in which the appended claims are expressed.

We claim:

1. A system for producing power, the system comprising
   (a) a filter assembly comprising:
      (i) a housing having an inlet and an outlet, the inlet receiving dirty atmospheric air into the filter assembly, and the outlet receiving clean air from the filter assembly;
      (ii) an end cap attached to an edge portion of said filter assembly;
      (iii) a filter element within said housing, the filter element comprising:
         (A) a physical filter portion constructed and arranged to remove particulate contaminants from the dirty air; and
         (B) a chemical filter portion constructed and arranged to remove chemical contaminants from the dirty air, wherein the chemical filter portion includes:
            (1) an acidic material capable of chemisorbing basic contaminants, or
            (2) a basic material capable of chemisorbing acidic contaminants, or
            (3) an acidic material capable of chemisorbing basic contaminants and a basic material capable of chemisorbing acidic contaminants; and
            (4) a shaped adsorbent material formed by extrusion, wherein the filter element is cylindrical and extends between the end cap and a second end cap;
   (b) a fuel cell having an air intake port; said air filter assembly constructed and arranged to provide clean air from the outlet of the filter assembly to the intake port of the fuel cell.

2. The system according to claim 1 wherein the chemical filter portion comprises activated carbon including a surface coating of an acidic material or a surface coating of a basic material.

3. The system according to claim 1, wherein the chemical filter portion comprises activated carbon impregnated with an acidic material or basic material.

4. The system according to claim 1, wherein the chemical filter portion includes one of the group consisting of: potassium permanganate, calcium carbonate, potassium carbonate, sodium carbonate, calcium sulfate, and mixtures thereof 5. The system according to claim 1, wherein the physical filter portion comprises a pleated configuration.

6. The system according to claim 1, wherein the chemical filter portion has a pleated or honeycomb structure.

7. A method of providing an air stream to a gas inlet of a fuel cell, the method comprising:

providing a system for producing power, the system comprising
   (a) a filter assembly comprising:
      (i) a housing having an inlet and an outlet, the inlet receiving dirty atmospheric air into the filter assembly, and the outlet receiving clean air from the filter assembly;
      (ii) an end cap attached to an edge portion of said filter assembly.
      (iii) a filter element within said housing, the filter element comprising:
         (A) a physical filter portion constructed and arranged to remove particulate contaminants from the dirty air; and
         (B) a chemical filter portion constructed and arranged to remove chemical contaminants from the dirty air, wherein the chemical filter portion includes:
            (1) an acidic material capable of chemisorbing basic contaminants, or (2) a basic material capable of chemisorbing acidic contaminants, or
(3) an acidic material capable of chemisorbing basic contaminants and a basic material capable of chemisorbing acidic contaminants;
wherein the chemical filter portion further comprises a shaped adsorbent material formed by extrusion, and wherein the filter element is cylindrical and extends between the end cap and a second end cap;
(b) a fuel cell having an air intake port; said air filter assembly constructed and arranged to provide clean air from the outlet of the filter assembly to the intake port of the fuel cell;
passing an inlet air stream into the filter assembly;
removing particulate and chemical contaminants from the air stream with the filter assembly to provide an outlet air stream; and
providing the outlet air stream to the inlet of the fuel cell.

8. The method according to claim 7 wherein the chemical filter portion comprises activated carbon including a surface coating of an acidic material or a surface coating of a basic material.

9. The method according to claim 7, wherein the chemical filter portion comprises activated carbon impregnated with an acidic material or basic material.

10. The method according to claim 7, wherein the chemical filter portion includes one of the group consisting of: potassium permanganate, calcium carbonate, potassium carbonate, sodium carbonate, calcium sulfate, and mixtures thereof.

11. The method according to claim 7, wherein the physical filter portion comprises a pleated configuration.

12. The method according to claim 7, wherein the chemical filter portion has a pleated or honeycomb structure.

13. A system for producing power, the system comprising:
(a) a filter assembly comprising:
(i) a housing having an inlet and an outlet, the inlet receiving dirty atmospheric air into the filter assembly, and the outlet receiving clean air from the filter assembly;
(ii) a filter element within said housing, the filter element comprising:
(A) a physical filter portion constructed and arranged to remove particulate contaminants from the dirty air; and
(B) a chemical filter portion constructed and arranged to remove chemical contaminants from the dirty air comprises a shaped adsorbent material formed by extrusion, and
(C) wherein the filter element is cylindrical and extends between two end caps;
(b) a fuel cell having an air intake port; said air filter assembly constructed and arranged to provide clean air from the outlet of the filter assembly to the intake port of the fuel cell.

14. The system of claim 13 wherein one end cap is open to an interior volume of the cylindrical filter element and one end cap is closed to the interior volume.

15. The system of claim 13 wherein shaped adsorbent material comprises 2% to 30% binder material and 70% to 90% adsorbent material.

16. The system according to claim 13 wherein the chemical filter portion comprises activated carbon including a surface coating of an acidic material or a surface coating of a basic material.

17. The system according to claim 13, wherein the chemical filter portion comprises activated carbon impregnated with an acidic material or basic material.

18. The system according to claim 13, wherein the chemical filter portion includes one of the group consisting of: potassium permanganate, calcium carbonate, potassium carbonate, sodium carbonate, calcium sulfate, and mixtures thereof.

19. The system according to claim 13, wherein the physical filter portion comprises a pleated configuration.

20. A method of providing an air stream to a gas inlet of a fuel cell, the method comprising:
providing a system for producing power, the system comprising
(a) a filter assembly comprising:
(i) a housing having an inlet and an outlet, the inlet receiving dirty atmospheric air into the filter assembly, and the outlet receiving clean air from the filter assembly;
(ii) a filter element within said housing, the filter element comprising:
(A) a physical filter portion constructed and arranged to remove particulate contaminants from the dirty air; and
(B) a chemical filter portion constructed and arranged to remove chemical contaminants from the dirty air comprises a shaped adsorbent material formed by extrusion, and
(C) wherein the filter element is cylindrical and extends between two end caps;
(b) a fuel cell having an air intake port; said air filter assembly constructed and arranged to provide clean air from the outlet of the filter assembly to the intake port of the fuel cell;
passing an inlet air stream into the filter assembly;
removing particulate and chemical contaminants from the air stream with the filter assembly to provide an outlet air stream; and
providing the outlet air stream to the inlet of the fuel cell.

21. The method of claim 20 wherein one end cap is open to an interior volume of the cylindrical filter element and one end cap is closed to the interior volume.

22. The method of claim 20 wherein shaped adsorbent material comprises 2% to 30% binder material and 70% to 90% adsorbent material.

23. The method according to claim 20 wherein the chemical filter portion comprises activated carbon including a surface coating of an acidic material or a surface coating of a basic material.

24. The method according to claim 20, wherein the chemical filter portion comprises activated carbon impregnated with an acidic material or basic material.

25. The method according to claim 20, wherein the chemical filter portion includes one of the group consisting of: potassium permanganate, calcium carbonate, potassium carbonate, sodium carbonate, calcium sulfate, and mixtures thereof.

26. The method according to claim 20, wherein the physical filter portion comprises a pleated configuration.

* * * * *